June 5, 1962  A. EINSELE ET AL  3,038,116
CIRCUIT-BREAKER TESTING ARRANGEMENT
Filed March 11, 1959  2 Sheets-Sheet 1

INVENTORS
Arnold Einsele, Rudolph Prätsch
and Ernest Slamecka.
BY
Willard R. Crout
ATTORNEY

United States Patent Office 3,038,116
Patented June 5, 1962

3,038,116
CIRCUIT-BREAKER TESTING ARRANGEMENT
Arnold Einsele, Berlin-Siemensstadt, Rudolf Prätsch, Berlin-Wilmersdorf, and Ernest Slamecka, Berlin-Schlachtensee, Germany, assignors to Siemens-Schuckertwerke Aktiengesellschaft, Erlangen, Germany, a corporation of Germany
Filed Mar. 11, 1959, Ser. No. 798,764
15 Claims. (Cl. 324—28)

This invention relates to testing devices, and concerns particularly methods and devices for testing circuit-interrupting devices at high apparent power on a low-power source.

It is an object of the present invention to provide improved simply operating apparatus for testing circuit breakers under conditions simulating the conditions of short circuit at rated apparent power as they occur in actual operation.

It is another object of the invention to provide apparatus for automatically applying to a circuit-interrupting device a voltage surge simulating a recovery-voltage transient at the instant when the current to be interrupted falls to zero.

It is a further object of the present invention to provide a simple, reliable arrangement for applying to circuit-interrupting devices a synthetic test subjecting them to the conditions which would take place if testing under actual operating conditions at full line voltage.

In accordance with a simple form of the invention we provide a relatively low-voltage, high-current source for passing power current through a circuit breaker to be tested, and we provide a relatively low-power high-voltage source for supplying an additional voltage across the terminals of the breaker, when it is open to simulate the recovery voltage which would exist under full voltage, full power conditions.

In testing the maximum breaking capacity of high-voltage circuit breakers the difficulty is often encountered in that generally the test generator supplies only the short-circuit current for which the circuit breaker is rated, but the voltage produced by the test generator is lower than the rated voltage of the circuit breaker. For this reason, so-called synthetic testing methods have been developed.

For example, it is known to use two separate power sources for testing the breaking capacity of high-voltage circuit breakers, one of which power sources supplies the short-circuit current at a voltage, which is lower than the rated voltage of the circuit breaker. This is called the high-current source. The other power source supplies a voltage corresponding to the recovery voltage transient simulating the recovery voltage actually encountered in operation in the field, but supplying only a small current. This is known as the high-voltage source.

In accordance with one of the known synthetic test circuits employed, the circuit breaker to be tested has connected in series therewith an auxiliary circuit breaker, which receives the same "trip open" impulse at the same time, or approximately at the same time, as the circuit breaker, which is to be tested. With this known testing method, a current of small magnitude but high frequency is superimposed upon the current from the high-current circuit flowing through the circuit breaker to be tested. This occurs shortly before the current from the high-current circuit passes through zero, when the maximum arcing length has been reached. As a result, the current through the circuit breaker to be tested is caused to pass through zero with the voltage recovery slope with which the current of the high-current circuit would pass through zero if its flow were caused by the rated voltage of the circuit breaker, and after the current zero, the recovery voltage will appear across the circuit breaker to be tested without an interval of no-voltage application, interruption and arc extinction in the auxiliary circuit breaker having occurred shortly previously. With this testing method, the circuit breaker can be stressed in substantially the same manner as if it had been tested with the short-circuit current at the rated voltage of the circuit breaker, the conditions being such that the recovery voltage will correspond to the recovery voltage resulting from actual operating conditions in the field, or set up to specific requirements formulated by engineering societies.

It is a further object of the present invention to provide a method of testing the stress on high-voltage circuit interrupters upon the interruption of currents, wherein the circuit breaker to be tested has connected in series therewith a second auxiliary circuit breaker in a manner which is known, per se, there being provided a high-current source, which initially supplies both circuit breakers, and a high-voltage source which supplies the recovery voltage to the breaker under test. According to the invention, the high-voltage source begins to produce a voltage near the current zero of the current supplied by the high-current source, the curve of said voltage having the desired shape of the recovery voltage. This voltage from the high-voltage source is preferably applied to the circuit breaker to be tested only after the current supplied by the high-current source has passed through zero, whereas prior to this time the high-current circuit itself produces the recovery voltage having the desired voltage slope by a suitable selection of the magnitude of its operating voltage, natural frequency and damping.

Thus two factors important to the invention are that the generation of voltage in the high-voltage circuit is initiated near the time of current zero of the current supplied by the high-current source, and this voltage is applied to the test circuit breaker after the current from the high-current source has passed through zero. Prior to this time the recovery voltage has the desired slope, and is produced by the high-current circuit with suitable components. As a result, these two factors permit a simulation of the stressing conditions encountered in service, to which the circuit breaker will be subjected while in the field.

The method according to the present invention has the advantage over the known method mentioned above in that the high-voltage source may have a lower rating, since it need not supply a portion of the short-circuit current as it does with the conventional method. Furthermore, the inductance and capacitance of the high-voltage circuit need not be changed when the current strength in the high-current circuit is changed in the test. Therefore the capacitors in the high-voltage circuit may be encapsulated in air, oil or in other insulating medium.

As mentioned previously, there are certain requirements, which have to be observed in testing circuit breakers with respect to the slope, form and maximum value of the recovery voltage transient, such requirements arising from conditions during operation from the power line resulting from the circuit breaker being operated at full rated voltage and interrupting full short-circuit current. These requirements are also based on safety regulations. With the method according to the present invention, it is possible to meet to a considerable extent the desired requirements for a particular type of recovery voltage transient. Thus, the invention provides a synthetic testing circuit by means of which the circuit breaker is stressed, as required by the foregoing requirements. Underlying the inventive idea is the fact that for carrying out a test simulating actual field conditions, it is important that the relations near the current zero be realistic, that is, that the recovery voltage transient starting at the current zero has the proper slope from its initial beginning, and that said recovery voltage is superseded, without a pause, by a second voltage from the high-voltage circuit. It would be possible to take the recovery voltage from the high-voltage source exactly at the moment when the current in the high-current source passes through zero. This, however, would require a more complicated control than is necessary with the method according to the invention for setting up realistic conditions.

The method employed in the present invention differs essentially also from the conventional method employing a high-current circuit and a high-voltage circuit, wherein the high-voltage circuit is connected to the circuit breaker to be tested shortly before, at, or after the zero passage of the current in the high-current circuit. This known method does not provide for an auxiliary circuit breaker, with the result that part of the voltage of the high-voltage circuit will drain off through the high-current circuit, and thus represents a loss of energy, which makes it impossible to provide a true simulation of the recovery voltage. Also, with the known method there is not produced at the time of current zero of the high-voltage circuit a voltage corresponding to the recovery voltage and applied to the circuit breaker only after the current zero, whereas before this time the high-current circuit, suitably arranged, provides a recovery voltage having the desired slope.

Further objects and advantages will readily become apparent upon reading the following specification, taken in conjunction with the drawings, in which.

Figure 1:
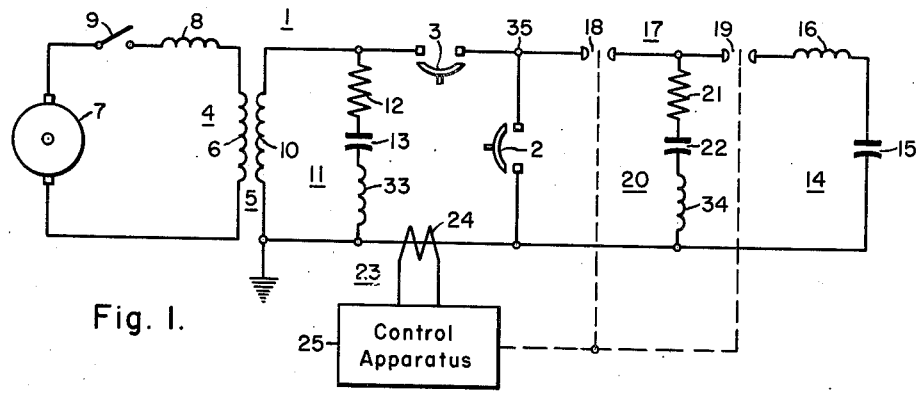
FIG. 1 is a circuit diagram representing schematically one embodiment of the invention.

Referring to the drawings, and more particularly to FIG. 1 thereof, the reference numeral 1 generally designates a circuit-breaker testing arrangement. The circuit breaker unit to be tested is designated by the reference numeral 2 and it is connected in series with an auxiliary circuit-breaker unit 3. The series circuit containing these two circuit breaker units 2, 3 is connected to a source of high alternating current, generally designated by the reference numeral 4. The current supply circuit 4 includes a transformer 5, the primary winding 6 of which is connected to the testing generator 7 through a current-limiting coil 8 and an operating switch 9. The generator 7, together with the transformer 5, forms the high alternating current source, which supplies the required short-circuit current at a voltage which is lower than the rated voltage of the circuit interrupter 2. As shown in FIG. 1, the test circuit-breaker unit 2 and the auxiliary circuit-breaker unit 3 are in series with the secondary winding 10 of the transformer 5.

Connected in shunt relationship with the series circuit containing the circuit-breaker units 2, 3 is a first impedance means generally designated by the reference numeral 11. The first impedance means 11 includes a resistor 12 connected in series with a capacitor 13. This impedance means 11, including the resistance 12 and the capacitor 13, serves to set up the natural frequency and the damping of the high-current circuit 4, in order to obtain the desired slope of the recovery voltage after the passage of the current through zero from the high-current source 4.

The high-voltage source, generally designated by the reference numeral 14, includes a capacitor 15, which is charged with direct current. In series with the high-voltage source 14 is an inductance 16. There is also supplied spark-gap means, generally designated by the reference numeral 17, including a first spark-gap 19 and a second spark-gap 18.

Also associated with the high-voltage source 14 is a second impedance means, generally designated by the reference numeral 20. The second impedance means 20 includes a resistor 21 and a serially related capacitor 22. When the spark-gap 19 breaks down, the impedance branch 20 is supplied with the discharge current from the capacitor 15 through the inductance 16, and a voltage is obtained across the impedance branch 20, which has the desired slope, form and magnitude of the recovery voltage transient.

When the spark-gap 18 breaks down, the impedance branch 20, including the resistor 21 and the capacitor 22, is shunted across the test circuit-breaker unit 2. The impedance branch 20 serves to produce, in a manner similar to the impedance branch 11 in the high-current circuit, a recovery voltage in the high-voltage circuit 14 of such slope, magnitude and form, as is desired to properly stress the test circuit-breaker unit 2 in accordance with standard testing rules, regulations, or requirements demanded by the customer with respect to the power system used by him.

A time-delay means, generally designated by the reference numeral 23, is employed for a purpose more fully described hereinafter. Preferably the time-delay means 23 includes a current-responsive means, or a current transformer 24, the magnetization curve of which is approximately rectangular. As shown in FIG. 1, the primary winding of the current transformer 24 is included directly in the high-current circuit 4, and the impulse generated by the current transformer 24, near the current zero, acts upon the spark-gaps 18, 19 through a control apparatus 25.

For testing the breaking capacity of the test circuit-breaker unit 2, the circuit breaker units 2 and 3 are closed. Following this, the operating switch 9 is moved to its closed position. A short-circuit current will flow through both circuit breaker units 2 and 3, which will receive their opening impulses simultaneously, or substantially simultaneously. After the first passage of the current through zero, the two circuit-interrupting units 2, 3 are caused to reignite by the recovery voltage impressed thereacross, or by other means. It is presumed that this proces is repeated until the maximum arc-length distance has been reached. If the current passes through zero as the maximum arc-length distance is obtained, or shortly before such maximum arc-length distance is obtained, then a recovery voltage will be produced in the high-current circuit 4, the value of which can be predetermined by a suitable selection of the resistor 12, capacitor 13, as well as of the voltage of the high-current source 4, so that the slope of the recovery voltage will correspond at least to the initial slope of the recovery voltage desired. As a result of the foregoing, the recovery voltage transient develops initially exactly at the current zero, without an interval in which there is no voltage applied, thereby simulating the conditions encountered in the field during fault-current interruption at rated voltage in the vicinity of current zero, and at current zero.

As mentioned hereinbefore, an impulse is produced by the current transformer 24 approximately when the current through the units 2, 3 passes through current zero, which acting through the control means 25 causes a breakdown of the spark-gap 19 without a delay, and a subsequent breakdown of the spark-gap 18 with a slight delay. In this connection, it is to be noted that the previous current zeros occurring on the current wave, when reignition occurred, must have no influence upon the control of the spark-gaps 18, 19. In other words, such an undesirable influence may be prevented, for example, by an impulse-suppressing means, which is adjustable with respect to time.

As the spark-gap 19 breaks down, the capacitor 15 discharges through the inductance 16, the resistor 21 and the capacitor 22. Preferably, the charged capacitor 15 is relatively large, so that it almost acts as a constant source of direct current. Across the second impedance means 20, including the resistor 21 and the capacitor 22, there will now be a voltage generated which, in respect to its slope, form and magnitude, corresponds to the required recovery voltage transient, if all the components have been properly chosen, that is, the value of the voltage source 14, the magnitude of capacitor 15, and the value of inductance 16, resistance 21 and capacitor 22.

Shortly after the breakdown of the first spark-gap 19, the recovery voltage, thus being built up across the second impedance branch 20, will be applied, in shunt relationship, to the circuit-breaker unit 2 due to the subsequent breakdown of the second spark-gap 18, and it will now supersede the place of the recovery voltage transient generated by the high-current source 4.

Figure 2:
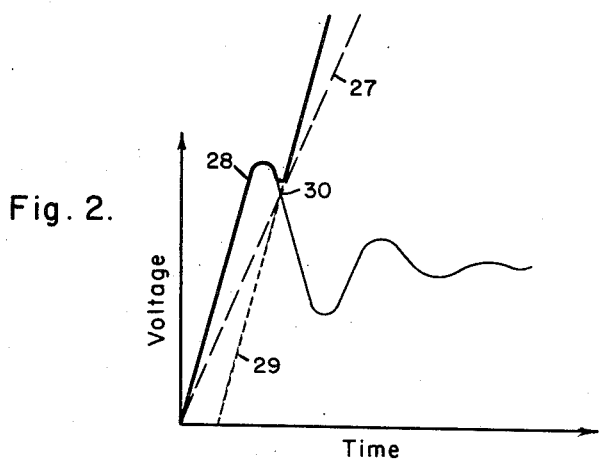
FIGS. 2–4 illustrate graphically the voltage relationships near a current zero.
Figure 3:
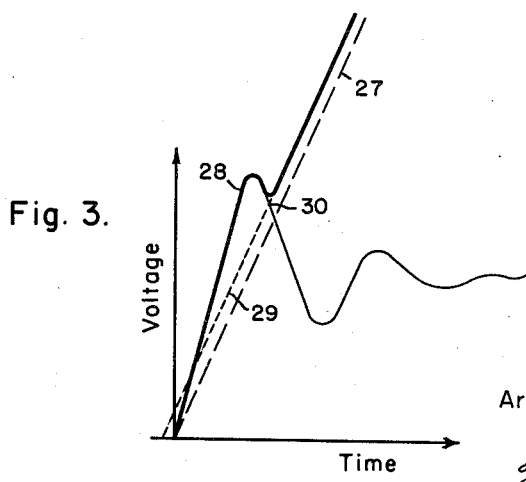
Figure 4:
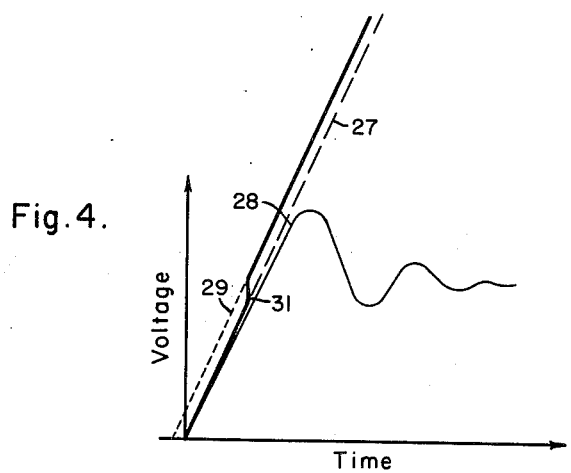

FIGS. 2, 3 and 4 show diagrammatically the voltage relations near the current zero of the current wave generated by the high-current source 4. In these figures, the broken line 27 represents the recovery voltage transient, as required by testing regulations. The recovery voltage transient supplied by the high-current source 4 is indicated by the full line 28, whereas the recovery voltage generated across the impedance branch 20, including the resistor 21 and the capacitor 22, is designated by the reference numeral 29.

In FIG. 2, the voltage 29 begins somewhat after the passage of the high-current through zero. It will be noted that the recovery voltage 28 has a somewhat greater slope than the recovery voltage 27 desired. Likewise, the recovery voltage 29 has a somewhat greater slope than the recovery voltage 27. In the region where the voltages 28 and 29 have approximately the same magnitude, for example, at the point 30, the spark-gap 18 is caused to breakdown, so that a true recovery transient voltage is obtained, which corresponds to the heavy line shown in FIG. 2. It will be noted that the application of this recovery voltage imposes a stress upon the test circuit-breaker unit 2 with regard to its dielectric strength, which is somewhat greater than the stress encountered in actual service.

In FIG. 3 the recovery voltage 28 is the same as in FIG. 2. It will be noted, however, that the recovery voltage 29 has the same slope as the recovery voltage 27, but it begins slightly ahead of current zero, which can be obtained by a suitable bias magnetization of the current transformer 24. In this case, also, the breakdown of the spark-gap 18 takes place approximately at the instant when the two voltages 28, 29 have the same value, so that as a result the recovery voltage obtained is such as indicated by the heavy line.

In FIG. 4, voltage 28 has the same slope as voltage 27. The recovery voltage 29 begins somewhat ahead of the time of current zero, but has the same slope as voltage 27. In the region where the two voltages 28 and 29 correspond most closely to each other, for example, at point 31, the spark-gap 18 is caused to breakdown. Here again the heavy-line curve represents the actual recovery voltage obtained.

Figure 5:
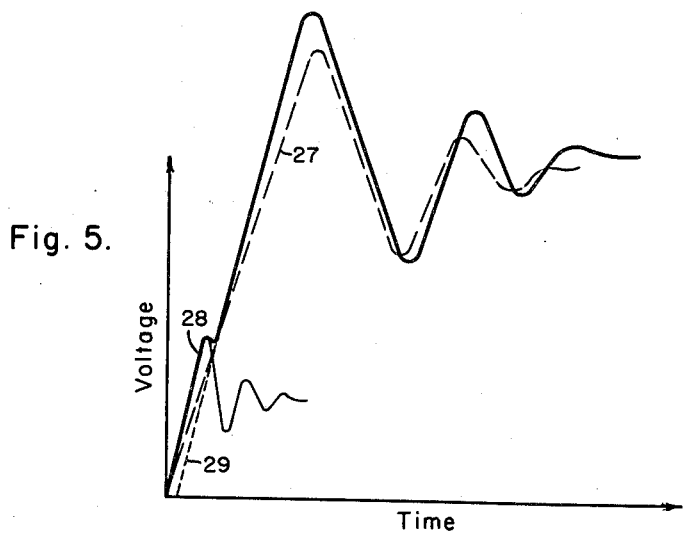
FIG. 5 illustrates graphically the entire characteristic of the recovery voltage; and, FIGS. 6–9 illustrate various shunting arrangements, which may be employed with the auxiliary circuit interrupter.

Whereas FIGS. 2–4 illustrate the relations near the time of current zero on the current wave, FIG. 5 represents the entire characteristic of the recovery-voltage wave. As noted, it is composed of parts of the voltages 28 and 29. The required recovery voltage 27 is shown in broken lines. From this figure it can be seen how closely the actual and the required recovery-voltage transients correspond to each other.

In the embodiment of the invention illustrated in FIG. 1, it will be noted that the resistor 12 and the capacitor 13 have connected in series therewith an inductance 33. This inductance 33 will increase the slope of the recovery voltage obtained from the high-current source 4. It will be used in case the desired voltage slope cannot be obtained by increasing the frequency of the high-current circuit 4 alone. FIG. 1 further shows that an inductance 34 may also be connected in series with the resistor 21 and the capacitor 22. Inclusion of the inductance 34 is of advantage when it is desired to simulate a recovery voltage, which in its rise has one or more peaks.

If during the testing of the circuit-breaker unit 2, the auxiliary circuit-breaker unit 3 should reignite or restrike, which is undesirable, the voltage of the high-voltage circuit 14 will be added in the high-current circuit 4. In order to prevent damage to the high-current circuit 4 in this eventuality, a ground connection may be provided in parallel to the secondary winding 10 of the transformer 5, or there may be provided a larger capacitor, which can be connected in circuit through a spark-gap.

The capacitor 22 in the high-voltage circuit 14 is so chosen that its capacity is large as compared to the resultant capacity in the high-current circuit 4 between the terminal 35 of the test interrupting unit 2 and ground, so as to cause this capacity to have only a slight influence on the characteristic of the recovery voltage wave.

Figure 6:
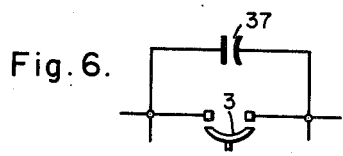

The testing procedure may also be performed by adjusting the spacing between the contacts of the circuit breaker units 2, 3 so as to provide the maximum arc-length distance, and by bridging the contacts of each circuit breaker 2, 3 by means of a fuse wire, not shown. As a result, if current is caused to flow, an arc will be established in both circuit breaker units 2, 3 and, as the current passes through zero, the same relations will be set up, as have been described hereinbefore. In general, however, circuit-breaker units, particularly power breakers, with only a small quantity of liquid, will be tested by the method as described with reference to FIG. 1, since in this manner the circuit-breaker unit, to be tested, is not only tested in respect to its dielectric strength, but also with respect to its resistivity to the arc energy, or power. With this test it is also assumed that the auxiliary circuit-breaker unit 3, as well as the circuit breaker unit under test 2, will restrike at each zero passage of the current until the maximum arc-length distance has been reached. If the voltage of the test current source 4 is too low, it is possible, for example, to apply restriking impulses at the passage of the current through zero. There may also be used other means to effect a repeated reignition. For this purpose, it is possible to effect an unsymmetrical distribution of the recovery voltage, for example, by connecting an impedance branch in parallel to one of the two circuit-breaker units 2, 3. If, for example, a capacitor 37 is connected in parallel to the auxiliary circuit-breaker unit 3, as shown in FIG. 6, nearly the full recovery voltage will appear across the circuit breaker unit 2 from the moment that the arc is extinguished in both circuit breaker units 2, 3. As this voltage causes the circuit breaker unit 2 to break down, this same voltage will now be applied to the auxiliary circuit-breaker unit 3, so that the latter will also be reignited again. In this manner, a relatively small test voltage may still be caused to effect reignition of the two circuit-breaker units 2, 3 until the maximum arc-length distance has been reached.

Preferably, such an impedance, for example the capacitor 37 in FIG. 6, is connected in parallel to the circuit-breaker unit 3, since in this manner the recovery voltage, supplied by the high-current source 4, will appear almost entirely across the circuit-breaker test unit 2 after the maximum arc-length distance has been reached, which is advantageous according to the invention, inasmuch as it will be easier thereby to simulate the recovery voltage desired.

Figure 7:
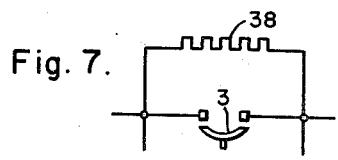

FIG. 7 illustrates an impedance connection across the auxiliary circuit-breaker unit 3, in this instance assuming the form of a resistor 38. Its function will be similar to that described above in connection with the capacitor 37 of FIG. 6.

Figure 8:
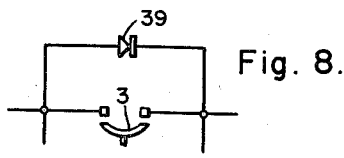
Figure 9:
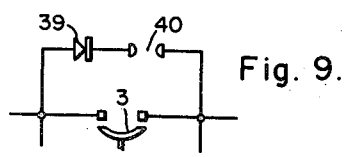

Instead of providing an impedance, such as the capacitor 37 of FIG. 6, or the resistor 38 of FIG. 7, a rectifier valve may also be used for the same purpose, for instance a dry-type rectifier valve. In utilizing a rectifier valve, such as indicated in FIG. 8 represented as the valve 39, the following is to be noted: If the arc is maintained only for the duration of a half wave until the maximum arc-length distance is reached, the valve 39 may be kept in parallel relation to the circuit-breaker unit 3. This valve 39 must be so connected that the arc voltage will cause the valve 39 to become effective in the reverse direction, so as thereby to cause the full recovery voltage to be impressed across the circuit-breaker unit 2. If several half waves of current are required before the maximum arc-length distance is obtained, then the arrangement must be such that the rectifier valve will be connected in parallel only in the last half wave, for example, by the breakdown of a spark-gap, such as 40 in FIG. 9.

In order to obtain realistic conditions, it is necessary for the current supplied by the high-current circuit 4 not to undergo a substantial change in direction near the current zero. In this connection, the arc voltage in the circuit-breaker unit must have no effect, or only a small effect, upon the form of current. This is the case where the arc voltage is small relative to the voltage of the high-current circuit 4.

Although so far the testing method according to the invention has been described as employed for testing high-voltage circuit interrupters, it is to be clearly understood that it could also be applicable to testing other switching apparatus, such as current converters.

The high-voltage source 14 in FIG. 1 has been represented as a capacitor 15, which is charged with direct current. Instead of this capacitor 15, a generator not shown, may also be used, which would have the same frequency as the high-current generator 7, and would operate in synchronism with the latter. Moreover, there may also be used a high-tension line. In this case, the phase angle must be such that the spark-gap 19 will break down in the region of the maximum voltage delivered by the high-voltage generator. Likewise, the generator, representing the high-current source 4, may be replaced by a capacitor having a suitable value, and being charged with direct-current voltage, or there may be used the existing high-voltage mains.

The proposed method, according to the present invention, may also be employed to test the circuit-breaker unit 2 with respect to its ability to effect momentary interruptions. In this case, the first circuit interruption may be followed, after a short interruption period, by a reclosing operation of the two circuit breaker units 2, 3. In such a case, the circuit breaker unit 2 has applied to it the direct-current voltage of the capacitor 22, which direct current voltage may be adjusted to correspond to the peak value of the rated alternating voltage of the circuit breaker, so that upon closing of the latter a spark over will occur at a certain length of the contact-closing distance in the same manner as during actual interruption. As a result, the capacitor 22 discharges in a fraction of milliseconds so that the spark-gap 18 will extinguish. Thus the original conditions are again set up, since the spark-gap 19 has already extinguished at the same value of the voltage across the capacitors 22 and 15. Thus the next interruption test may be conducted as hereinbefore described. It should be noted that during the second interruption, the last half wave of the current of the high-current circuit 4 has the same polarity as during the first interruption. If this condition does not exist, the capacitor 15 must be so connected that its polarity will be reversed.

The testing method according to the present invention can be applied not only to determine the dielectric strength of the circuit-breaker unit 2 at the maximum arc-length distance, but also to test the dielectric strength of the circuit breaker 2 with different spacing distances between the contacts.

In order to prevent the auxiliary circuit-breaker unit 3 from being reignited by the recovery voltage after the last passage of the current through zero in the high-current circuit 4, various means may be used. For example, by utilizing the capacitor 37 of FIG. 6 connected in parallel to the auxiliary circuit breaker unit 3, the greatest portion of the recovery voltage can be applied to the circuit-breaker unit 2 to be tested. Likewise, the same objective may be achieved by applying the opening impulse to the auxiliary circuit-breaker unit 3 somewhat earlier than to the circuit-breaker unit 2 under test. In addition, there may be employed an auxiliary circuit breaker in which the effect of the extinguishing medium is increased during the last half wave of the current.

Although there have been illustrated and described specific arrangements for subjecting circuit breaker units to test under conditions simulating field fault current interruptions under rated voltage, it is to be clearly understood that the same were merely for the purpose of illustration, and that the same may be modified by those skilled in the art without departing from the spirit and scope of the invention.

We claim as our invention:

1. Apparatus for testing circuit-interrupting devices including in combination, a circuit-interrupting device to be tested, an auxiliary circuit-interrupting device, a supply circuit for alternating current to be interrupted, means connecting the circuit-interrupting device to be tested and the auxiliary circuit-interrupting device in series circuit relation to said supply circuit for alternating current, impedance means including a resistance capacitance and inductance in series all connected in shunt relationship to said two circuit-interrupting devices, a high-voltage source for supplying a simulated recovery voltage across the circuit-interrupting device to be tested, means causing the high-voltage source to begin to produce said simulated recovery voltage near a current zero in the alternating current to be interrupted, and time-delay means for delaying the imposition of the simulated recovery voltage until a predetermined time following said current zero, said impedance means functioning to set up the natural frequency and damping of the high-current circuit to obtain the desired slope of the recovery voltage immediately following said current zero prior to said imposition of the simulated recovery voltage from the high-voltage source.

2. Apparatus for testing circuit-interrupting devices including in combination, a circuit-interrupting device to be tested, an auxiliary circuit-interrupting device, a supply circuit for alternating current to be interrupted, means connecting the circuit-interrupting device to be tested and the auxiliary circuit-interrupting device in series circuit relation to said supply circuit for alternating current, impedance means including a resistance and a capacitance in series connected in shunt relationship to said two circuit interrupting devices, a high-voltage source for supplyng a simulated recovery voltage across the circuit-interrupting device to be tested, means causing the high-voltage source to begin to produce said simulated recovery voltage near a current zero in the alternating current to be interrupted, and time-delay means for delaying the imposition of the simulated recovery voltage until a predetermined time following said current zero, said impedance means functioning to set up the natural frequency and damping of the high-current circuit to obtain the desired slope of the recovery voltage immediately following said current zero prior to said imposition of the simulated recovery voltage from the high-voltage source.

3. An arrangement for testing circuit-breaker units at rated kilovolt amperes without the expenditure of a corresponding amount of power, said arrangement including in combination with the circuit-breaker unit to be tested, an auxiliary circuit-breaker unit, a source of alternating current, means connecting said circuit-breaker units in series with the current source, a high-voltage source for applying a simulated recovery voltage to the breaker unit under test, a first spark-gap, impedance means including a resistor and a capacitor connected to said high-voltage source through the first spark-gap, a second spark-gap, said impedance means being connected in shunting relationship with said circuit-breaker unit to be tested through said second spark-gap, and current-responsive means responsive to the passage of the current through zero from the current source to consecutively cause breakdown of the first and second spark-gaps and thereby effect imposition of the high-voltage recovery voltage to the test unit.

4. An arrangement for testing circuit-breaker units including in combination with a unit to be tested, an auxiliary circuit-breaker unit, a high-current source, a high-voltage source for applying a simulated recovery voltage to the breaker unit under test, means connecting said circuit-breaker units in series circuit relation to said high-current source, first impedance means including a serially related resistor and capacitor connected in shunt relationship to said two circuit-breaker units, a first spark-gap, second impedance means including a resistor and a capacitor connected to said high-voltage source through the first spark-gap, a second spark-gap, said second impedance means being connected in shunting relationship with said circuit-breaker unit to be tested through said second spark-gap, and current-responsive means responsive to the passage of the current through zero from the current source to consecutively cause breakdown of the first and second spark-gaps and thereby effect imposition of the high-voltage recovery voltage to the test unit.

5. An arrangement for testing circuit-breaker units including in combination with a unit to be tested, an auxiliary circuit-breaker unit, a high-current source, a high-voltage source for applying a simulated recovery voltage to the breaker unit under test, means connecting said circuit-breaker units in series circuit relation to said high-current source, first impedance means including a serially related resistor and capacitor connected in shunt relationship to said two circuit-breaker units, a first spark-gap, second impedance means including a resistor and a capacitor connected to said high-voltage source through the first spark-gap and an inductance, a second spark-gap, said second impedance means being connected in shunting relationship with said circuit-breaker unit to be tested through said second spark-gap, and current-responsive means responsive to the passage of the current through zero from the current source to consecutively cause breakdown of the first and second spark-gaps and thereby effect imposition of the high-voltage recovery voltage to the test unit.

6. An arrangement for testing circuit-breaker units at rated kilovolt amperes without the expenditure of a corresponding amount of power, said arrangement including in combination with the circuit-breaker unit to be tested, an auxiliary circuit-breaker unit, a source of alternating current, means connecting said circuit-breaker units in series with the current source, a high-voltage source for applying a simulated recovery voltage to the breaker unit under test, a first switching means, impedance means including a resistor and a capacitor connected to said high-voltage source through the first switching means, a second switching means, said impedance being connected in shunting relationship with said circuit-breaker unit to be tested through said second switching means, and current-responsive means responsive to the passage of current through zero from the current source to consecutively cause closing of the first and second switching means and thereby effect imposition of the high-voltage recovery voltage to the test unit.

7. An arrangement for testing circuit-breaker units including in combination with a unit to be tested, an auxiliary circuit-breaker unit, a high-current source, a high-voltage source for applying a simulated recovery voltage to the breaker unit under test, means connecting said circuit-breaker units in series circuit relation to said high-current source, first impedance means including a serially related resistor and capacitor connected in shunt relationship to said two circuit-breaker units, a first switching means, second impedance means including a resistor and a capacitor connected to said high-voltage source through the first switching means, a second switching means, said second impedance means being connected in shunting relationship with said circuit-breaker unit to be tested through said second switching means, and current-responsive means responsive to the passage of the current through zero from the current source to consecutively cause closing of the first and second switching means and thereby effect imposition of the high-voltage recovery voltage to the test unit.

8. Apparatus for testing circuit-interrupting devices including in combination, a circuit-interrupting device to be tested, an auxiliary circuit-interrupting device, a supply circuit for alternating current to be interrupted, means connecting the circuit-interrupting device to be tested and the auxiliary circuit-interrupting device in series circuit relation to said supply circuit for alternating current, impedance means including a resistor, capacitor and an inductance connected in shunt relationship to said two circuit-interrupting devices, a high-voltage source for supplying a simulated recovery voltage across the circuit-interrupting device to be tested, means causing the high-voltage source to begin to produce said simulated recovery voltage near a current zero in the alternating current to be interrupted, and time-delay means for delaying the imposition of the simulated recovery voltage until a predetermined time following said current zero, said impedance means functioning to set up the natural frequency and damping of the high-current circuit to obtain the desired slope of the recovery voltage immediately following said current zero prior to said imposition of the simulated recovery voltage from the high-voltage source.

9. An arrangement for testing circuit-breaker units including in combination with a unit to be tested, an auxiliary circuit-breaker unit, a high-current source, a high-voltage source for applying a simulated recovery voltage to the breaker unit under test, means connecting said circuit-breaker units in series circuit relation to said high-current source, impedance means including a resistor, capacitor and an inductance, first switching means for connecting said impedance means in shunting relationship to said high-voltage source, second switching means for connecting said impedance means in shunt with the test unit, and means for consecutively closing the first and second switching means.

10. An arrangement for testing circuit-breaker units at rated kilovolt amperes without the expenditure of a corresponding amount of power, said arrangement including in combination with the circuit-breaker unit to be tested, an auxiliary circuit-breaker unit, a source of alternating current, means connecting said circuit-breaker units in series with the current source, a high-voltage source for applying a simulated recovery voltage to the breaker unit under test, a first spark-gap, impedance means including a resistor and a capacitor connected to said high-voltage source through the first spark-gap, a second spark-gap, said impedance means being connected in shunting relationship with said circuit-breaker unit to be tested through said second spark-gap, and a current transformer excited by the current from the alternating-current source and responsive to the passage of the current through zero from the current source to consecutively cause breakdown of the first and second spark-gaps and thereby effect imposition of the high-voltage recovery voltage to the test unit.

11. An arrangement for testing circuit-breaker units including in combination with a unit to be tested, an auxiliary-circuit breaker unit, a high-current source, a high-voltage source for applying a simulated recovery voltage to the breaker unit under test, means connecting said circuit-breaker units in series circuit relation to said high-current source, means connecting the high-voltage source only across the circuit-breaker unit to be tested to the exclusion of the auxiliary circuit-breaker unit, and an impedance means shunting the auxiliary circuit-breaker unit to impose additional recovery voltage stress from the high-current source upon the test unit relative to the auxiliary circuit-breaker unit.

12. An arrangement for testing circuit-breaker units including in combination with a unit to be tested, an auxiliary circuit-breaker unit, a high-current source, a high-voltage source for applying a simulated recovery voltage to the breaker unit under test, means connecting said circuit-breaker units in series circuit relation to said high-current source, means connecting the high-voltage source only across the circuit-breaker unit to be tested to the exclusion of the auxiliary circuit-breaker unit, a rectifier valve shunting the auxiliary circuit-breaker unit to impose additional recovery-voltage stress from the high-current source upon the test unit, and said rectifier valve being arranged to be conducting during the half cycle following zero current interruption in the high-current circuit.

13. An arrangement for testing circuit-breaker units including in combination with a unit to be tested, an auxiliary circuit-breaker unit, a high-current source, a high-voltage source for applying a simulated recovery voltage to the breaker unit under test, means connecting said circuit-breaker units in series circuit relation to said high-current source, means connecting the high-voltage source only across the circuit-breaker unit to be tested to the exclusion of the auxiliary circuit-breaker unit, and an impedance means including a capacitor shunting the auxiliary circuit-breaker unit to impose additional recovery voltage stress from the high-current source upon the test unit relative to the auxiliary circuit-breaker unit.

14. An arrangement for testing circuit-breaker units including in combination with a unit to be tested, an auxiliary circuit-breaker unit, a high-current source, a high-voltage source for applying a simulated recovery voltage to the breaker unit under test, means connecting said circuit-breaker units in series circuit relation to said high-current source, means connecting the high-voltage source only across the circuit-breaker unit to be tested to the exclusion of the auxiliary circuit-breaker unit, and an impedance means including a resistor shunting the auxiliary circuit-breaker unit to impose additional recovery voltage stress from the high-current source upon the test unit relative to the auxiliary circuit-breaker unit.

15. An arrangement for testing circuit-breaker units including in combination with a unit to be tested, an auxiliary circuit-breaker unit, a high-current source, a high-voltage source for applying a simulated recovery voltage to the breaker unit under test, means connecting said circuit-breaker units in series circuit relation to said high-current source, means connecting the high-voltage source only across the circuit-breaker unit to be tested to the exclusion of the auxiliary circuit-breaker unit, a branch shunting circuit including a rectifier valve and a serially related spark gap shunting the auxiliary circuit-breaker unit to impose additional recovery-voltage stress from the high-current source upon the test unit.

References Cited in the file of this patent

UNITED STATES PATENTS

| | | |
|---|---|---|
| 2,222,711 | Grosse | Nov. 26, 1940 |
| 2,288,331 | Skeats | June 30, 1942 |
| 2,888,639 | Petermichl | May 26, 1959 |
| 2,898,548 | Slamecka | Aug. 4, 1959 |

FOREIGN PATENTS

| | | |
|---|---|---|
| 960,838 | Germany | Mar. 28, 1957 |
| 1,014,659 | Germany | Aug. 29, 1957 |